June 2, 1964 A. KEPKA ETAL 3,135,640
PROCESS OF AND AN APPARATUS FOR MANUFACTURING HOLLOW
ARTICLES FROM REINFORCED SYNTHETIC RESINS
Filed Oct. 3, 1958 3 Sheets-Sheet 1
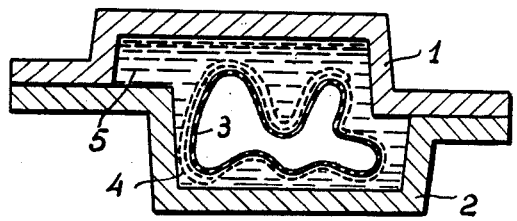
Fig. 1
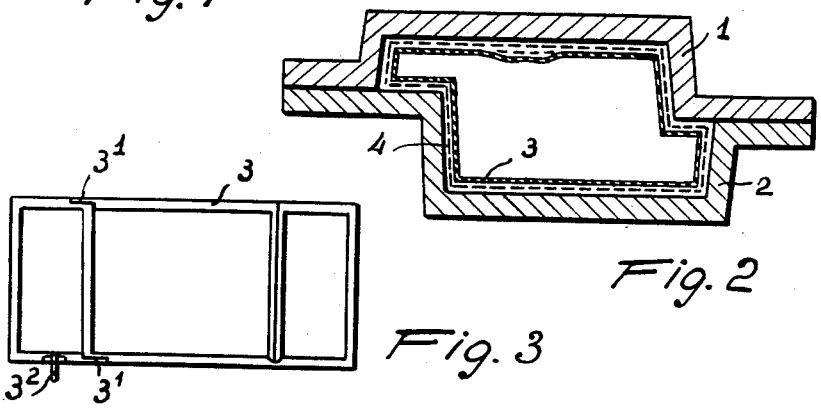
Fig. 2
Fig. 3
Fig. 4
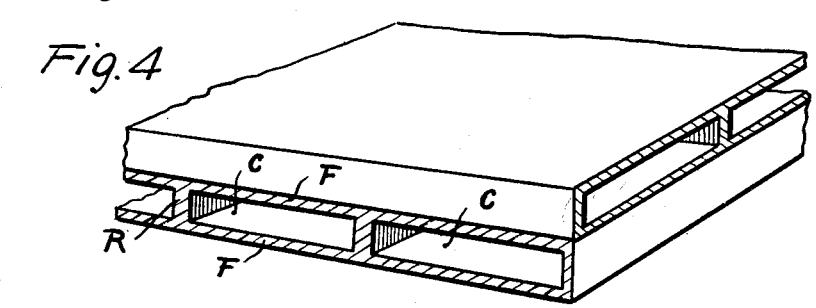
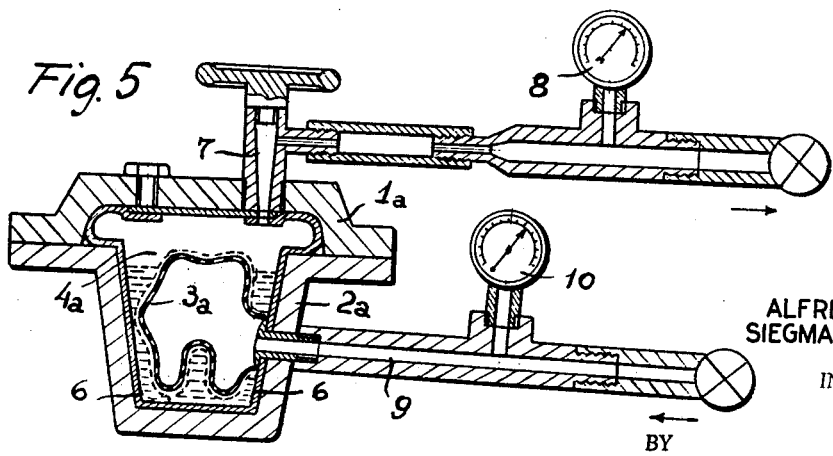
Fig. 5
ALFRED KEPKA
SIEGMAR KEPKA
INVENTOR.
BY Karl F. Ross
AGENT

ALFRED KEPKA
SIEGMAR KEPKA
INVENTOR.

ALFRED KEPKA
SIEGMAR KEPKA
INVENTOR.

United States Patent Office 3,135,640
Patented June 2, 1964

3,135,640
PROCESS OF AND AN APPARATUS FOR MANU-
FACTURING HOLLOW ARTICLES FROM REIN-
FORCED SYNTHETIC RESINS
Alfred Kepka and Siegmar Kepka, Munich, Germany
Filed Oct. 3, 1958, Ser. No. 765,237
Claims priority, application Germany Oct. 5, 1957
3 Claims. (Cl. 156—147)

This invention relates to a process of and an apparatus for manufacturing hollow articles (whose cavities may be occupied by suitable fillers) from synthetic resins (known also as plastic materials) suitable for molding processes, such materials being advantageously reinforced by fibrous materials.

It has been known heretofore to manufacture hollow articles, having substantially rounded cavities, from such reinforced plastics by inflating a dilatable bag placed within a mold and surrounded by plastic materials and fibrous materials, such bag having its walls increase in thickness from the bottom to the top, the plastic material being forced into the fibrous material from the bottom towards the top, thus allowing the air to be exhausted through the top. Although the problem of air escape, which is one of the main problems of this mode of operation, was efficiently solved, it is obvious that the increasing thickness of the walls of the inflating bag did not allow articles of complicated configuration to be so manufactured, apart from the danger inherein in such processes, of incorporating air bubbles at least in the surface of the reinforced plastic walls of the articles thus obtained.

It has been moreover proposed to manufacture certain larger size hollow articles from separate elements adapted to be secured to each other, for instance by adhesives or the like, which involved a highly accurate manufacture of the molds and of the molded pieces in order to have these elements efficiently fit together. Yet the greatest skill of manufacure with expensive techniques did not even attempt to remove from the assembled elements the visible connection seams unavoidably present.

On the other hand, if a mold of conventional structural features had to be used for manufacturing large sized articles, such as doors, furniture parts, window frames and the like, which articles are not suitable for mass production in large quantities, the costs of the conventional molds themselves would weigh heavily on the general manufacturing costs, to such an extent as practically to discourage the production of such articles with a molding system as known heretofore.

It has been furthermore already proposed to fill the cavities of hollow articles with certain fillers, as for instance foamed materials, but such fillers were as a general rule pre-foamed and arranged on solid or plastic layers or introduced into hollow cavities and subsequently welded thereto by chemical or physical actions, such as those obtained from heat, solvents, adhesive actions and the like. Such conventional processes for providing hollow articles with a filler involved, as is manifest, more than one operative molding step and in any event resulted in an expensive method, without being sufficiently reliable as to the completeness of the filling and the attainment of a desired stress resistance or stiffness by means of such fillers.

It is an object of this invention to obviate the drawbacks of conventional processes for manufacturing hollow articles from reinforced plastic materials, by providing a method which facilitates the manufacture of such articles even with a complex outer and/or inner shape.

It is a further object of this invention to provide a method of and an apparatus for manufacturing such articles wherein the air may be efficiently caused to be substantially completely exhausted or otherwise prevented from forming bubbles particularly on the visible surface of such articles.

Still a further object of this invention is to provide a method of and a suitable apparatus for manufacturing articles from individual pre-manufactured elements which are efficiently secured together and which do not require any specific careful construction, since their precise mutual fitting is no longer an essential requirement of their manufacture.

Another object of this invention is the provision of means to ensure a suitable control of the air in the molding means, having regard to both airtightness, with either compressed air (pressurized atmosphere in the mold) or vacuum conditions in the mold, and the exhausting and the feeding of air within or outside the mold.

More specifically, it is an object of this invention to provide means suitable for use in the molding of hollow articles having relatively large area, such as doors, furniture element, window frames and the like, without necessitating any reliance upon complicated molds, while using already existing or readily prepared ancillary means.

Furthermore it is an object of this invention to provide a process and a suitable apparatus for manufacturing by automatic continuous operation a hollow article with a foamed inner filler.

These and other objects are realized by a process according to the invention, which consists in placing in a mold which is capable of being tightly sealed, around at least one chamber capable of being substantially uniformly expanded, a reinforcing fibrous material and a quantity of synthetic resin enough to be saturatingly absorbed by the reinforcing fibrous materials at a chosen pressure, then evacuating the air from the interior of the mold, and subsequently expanding said chamber, thus forcing the synthetic plastic material into the fibrous reinforcing material and both such materials against the inner walls of the mold where a successive setting of the synthetic plastic material occurs. More particularly, during or before the formation of the vacuum in the inner part of the mold, the fluid synthetic resin is circulated within the mold and exhausted successively outside the mold, thus removing any residual from the mold.

The invention will now be more particularly described with reference to the accompanying drawing, wherein various embodiments of apparatus suitable for carrying out the process according to the invention are illustrated in an indicative and nonlimitative way. In the drawing:

FIGS. 1 and 2 are diagrammatical sectional views of a mold with a dilatable insert according to the invention, shown respectively before and after inflation of the insert.

FIG. 3 is a top view of an assembly of tube portions with overlapping ends;

FIG. 4 is a perspective view, partly in section of an article obtained by the process according to the invention;

FIG. 5 is a diagrammatical sectional view of an apparatus for manufacturing hollow articles from at least partly prefabricated elementary pieces, according to an alternative embodiment of the invention;

Figure 6:
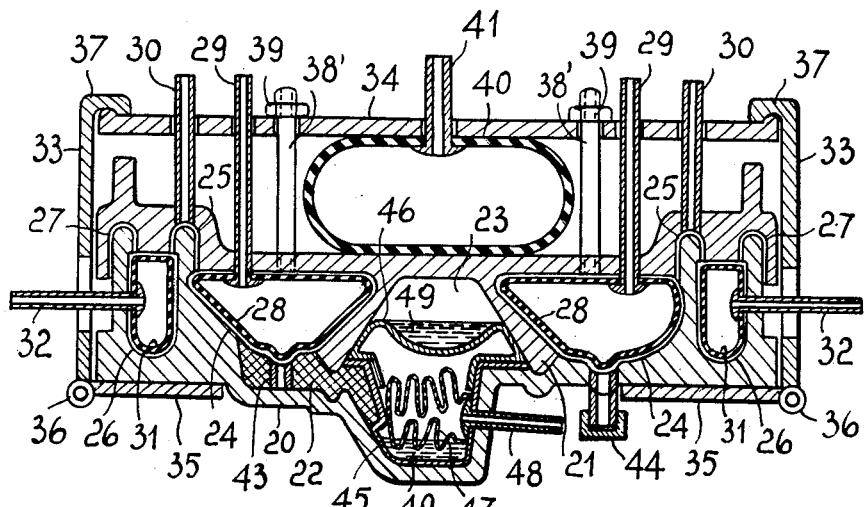
FIGS. 6 and 7 are diagrammatical sectional views of an apparatus for manufacturing hollow articles of large size or area from molds at least partly formed of assembled section pieces.

As shown more particularly in FIGS. 1 and 2, a mold for carrying into effect the process according to the invention may comprise two complementary parts 1, 2 defining an inner tightly sealed cavity. A flexible tube 3 is placed within this cavity, this tube having dilatable thin walls of substantially uniform thickness. Tube 3 is substantially completely surrounded by a layer 4 of reinforcing fibrous material, which for instance may be arranged by hand around the tube. The mold is then so positioned that a portion thereof is situated above the level of any other part, at least with reference to the inner cavity. This portion is then connected to a vacuum source in a conventional manner, for instance by a pipe connection situated on the top thereof, and a vacuum is thus created in said cavity. Before, during or after this vacuum operation a quantity of synthetic plastic material in a fluid state, shown at 5, is fed to the mold, if necessary under pressure, such quantity being larger than the quantity which is necessary for forming the finished article. This fluid plastic material is circulated through the mold until it is freed from any residual air when said quantity is caused to escape from the mold through a flexible conduit situated at the top. At this point, compressed air is admitted within the dilatable tube 3, conventional means being provided for admitting and controlling the air flow to the tube, which means comprise a tubular connection between an air compressor and the hose, and which are not illustrated since they are situated in another sectional plane. Consequently, the reinforcing fibrous material and the synthetic plastic material are forced by the tube or bladder against the walls of the mold, whilst the plastic material enters the interstices among the fibers of the reinforcing material and the excess thereof is discharged. Successively, the liquid plastic material is converted into a solid, as a consequence of the setting or polymerization according to conventional methods. The tube may be left in the article thus finished, as it appears from FIG. 2.

The expelled fluid plastic material may be collected in a reservoir and reused. Obviously, after having filled the mold with the liquid plastic material, one closes the inlet at the bottom of the mold for this plastic material.

It has been found that as a consequence of the pressure created by the inflation of said tube, and as a consequence of the thin walls of such tube any internal cavity, branch or corner thereof is completely filled and any residual air is expelled.

It is obvious that instead of using a single tube, a plurality of such tubes, if necessary, in communication with each other, may be used, at least some portions of such tubes being superposed as is shown at $3^1$, FIG. 3. The latter shows a series of tube portions 3, one of which is provided with a valve $3^2$. If such tubes are spaced from each other and the gap between them is filled with the reinforcing fibrous material and with some quantity of liquid synthetic plastic material, a hollow article as shown in FIG. 4 may be manufactured wherein the inner cavity is provided with bridging ribs R connecting opposite faces F of the article across the cavities C.

In FIG. 5 an alternative embodiment is shown, wherein the elements which are similar or equivalent to those already shown in FIGS. 1 and 2, will be indicated with identical reference numerals, accompanied by the letter "a." In this alternative embodiment, at least part of the reinforcing fibrous material is replaced by pre-formed parts or mats of reinforcing resin pre-impregnated material or by pre-formed precured synthetic resin pieces. Such pre-formed mats may be for instance formed of fibrous material which is impregnated with synthetic resin binders, e.g. with resins which are of the same nature as those which will form the finished hollow article (such as unsaturated polyester resins). Such pre-formed mats, parts or pieces, which may be superposed along the margins, are shown in 6 and they are arranged, if necessary, so as to abut against rigid walls of the form $1_a$, $2_a$ and to surround, in association with the loose fibrous material $4_a$, the dilatable bag or tube $3_a$. A conduit 7, to which a manometer 8 is branched, is connected with the inner cavity at the top of the mold $1_a$, $2_a$, such conduit being connected to a vacuum source. A further air conduit 9 arriving from an air compressor (not shown) is connected with the inner bag or tube $3_a$, traversing the mold $2_a$. A manometer 10 is connected to conduit 9. The mold may be further provided with an inlet 11 which can be tightly sealed, said inlet serving for introducing into the mold the fluid synthetic resin, but the latter is preferably poured into the mold before it has been closed.

Provision is made to increase the thickness of the layer of fibrous material at the points of the finished hollow article where it should be of increased thickness, and conversely to leave the dilatable bag or tube 3 free from the layer of preformed mats of fibrous material where apertures should be formed in the finished hollow article. After having sucked the air from the cavity of the mold and from the preformed fibrous mats by means of the conduit 7, until a sufficiently reduced pressure is attained, compressed air is admitted to the tube $3_a$, which when inflated, presses the fluid synthetic resin in the interstices between the fibers of the loose fibrous material, and partly between the fibers of the preformed mats. The latter may be, for example, not completely impregnated with respect to a certain pressure. Conveniently, the quantity of fluid synthetic resin in the mold is at least as large as the fibrous material may absorb at a certain pressure. When the feeding of the hose with compressed air is cut-off, if the pressure read on the manometer 10 decreases, then the fibrous material is in a position to absorb further fluid synthetic resin. If the pressure read on the manometer remains at a constant value, no further fluid synthetic resin can be absorbed and consequently the synthetic resin may be at this point suitably cured, for instance with the aid of conventional catalysts.

An article manufactured from partly preformed reinforcing material pads and/or partly from already preformed plastic pieces, as above described do not show generally any discontinuity between the individual parts; accordingly, it is possible to manufacture even hollow pieces of very large size or area or having a very intricate sectional internal or external shape.

Figure 7:
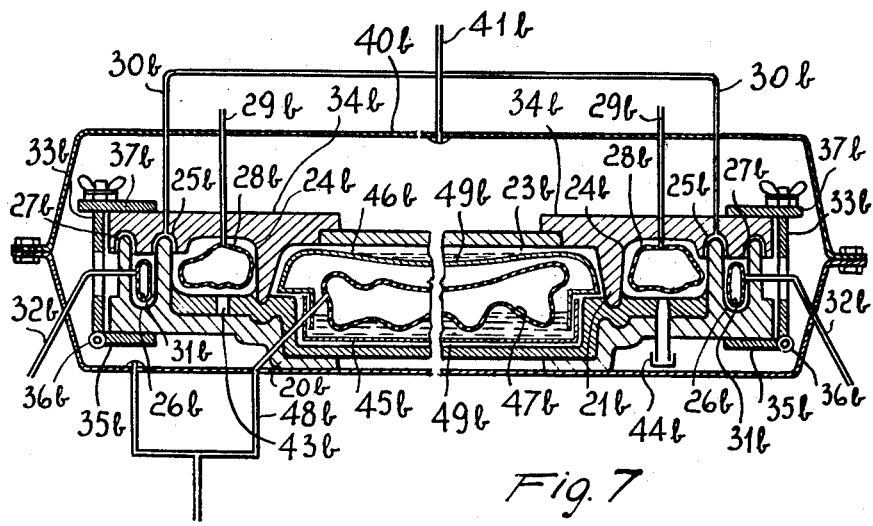

The carrying into effect of the process described hereinabove depends also upon the structural features of the mold, since it is clear that the use of a mold which is not capable of being imperviously sealed or which is not provided with irreprehensible molding surfaces (which involve high costs especially when large-area articles are to be molded) results in a large amount of defects, since they superficially incorporate air bubbles or irregularities, which are hardly removable. FIG. 6 and FIG. 7 show two embodiments of a molding apparatus, which may be formed of partly drawn pieces, assembled altogether so as to resolve the impervious tight sealing problem and the cost problem with respect to large-area articles, such as doors, furniture parts (as the carrying plane of a table).

Referring to FIG. 6, an apparatus facing the tight sealing problem of the inventive process is shown, such apparatus comprising the section pieces 20, 21 and the intermediate element 22, assembled altogether, so as to define the mold cavity 23. The two section pieces 20, 21 further define between themselves the vacuum and overflow channels 24, the conduits 25 and the sealing channels 26, connected with the auxiliary conduits 27, leading to the outside.

In the channels 24, a tube or bag 28 made of thin expansible material, such as rubber, synthetic resin and the like, may be disposed, such expansible tube or bag being connected to the pipes 29 leading to the exterior across the apparatus. A further pipe leading to the exterior is shown in 30 and is connected to the conduit 25, which connects the channels 24 and 26. A further sealing tube 31, also made of thin expansible material, is arranged in the channel 26 and is connected through the pipe 32 to the exterior. Clamp means 33, 34 are provided for tightly fastening the section pieces 20, 21, the clamp means 33 comprising an extension 35 secured to the section piece 20 and conveniently pivoted in 36, as well as a hooked end 37, suitable for co-operation with the complementary clamp means 34, guided by the bolts 38, the nuts 39 of which are serving also as stops for the ascendent displacement of the clamp means 34. A tube 40 is arranged between the clamp 34 and the section piece 21, and is connected to the exterior by the pipe 41. The channels 24 may be provided with bottom holes 42 lined with suitable bushes 43 which may be closed by means of caps 44.

According to the inventive process, pre-formed mats 45, 46 made of at least partly synthetic-resin-impregnated fibrous materials are arranged within the cavity 23, so as to partly abut against the walls of the cavity 23 and to have, if necessary, at least marginal parts thereof superposed. A hose 47 is disposed within the inner room defined by said mats, such tube being connected to the exterior by means of the pipe 48. A suitable quantity of fluid synthetic resin 49 is poured within the space defined by the mats 45, 46 and above the mat 46 which at the top is suitably preformed in the manner of a channel, such quantity being at least as large as necessary for saturatingly impregnating said mats 45, 46 at a certain pressure but which is generally larger than this quantity.

In order to tightly seal the molding apparatus, compressed air is admitted to the tube 40 through the pipe 41, whereby the clamp means 33, 34 are tightly pressed against each other. Pipes 32 are connected with an air compressor (not shown) and compressed air is admitted to the tube 31, which tightly seals the apparatus against any air inlet. Successively, pipes 29 and 30 are connected with a vacuum pump of any conventional type (not shown) and a vacuum is created in the tube 28 and in the channel 24. According to a feature of this invention, the interstices which cannot be eliminated between the section pieces 20, 21 and the intermediate piece 22, along the contact surfaces, are used for sucking, as a consequence of the vacuum created in the channels 24, the air contained in the cavity 23. If the tubes 31 do not completely seal the channels 26, any air admitted to the channels 24 will be exhausted through the vacuum pipes 29, 30. When the maximum degrees of vacuum is reached within the mold, the tubes 28 are inflated, whereby the cavity 23 is perfectly sealed. At this point, the tube 47 is inflated, whereby the fluid synthetic resin is pressed between the fibers of the pre-formed mats 45, 46, whilst the excess remains at the filling places. Subsequently, air is exhausted or sucked from the tubes 28, whereby the way for the excess of fluid synthetic resin from the cavity 23 towards the overflow channels 24 through said interstices is open. The excess of fluid synthetic resin along with any residual air is pressed into these overflow channels 24.

It is obviously possible to adjust to a certain extent the ratio between fibrous material and impregnating synthetic resin, by conveniently selecting the inflating pressure of the tube 47.

The outlets 41 are now opened by removal of the caps 44, whereby the fluid synthetic resin is discharged and a limited pressure is prevailing in the channels 24, thus facilitating the escape of synthetic resin from the mold cavity 23. Subsequently, the synthetic resin impregnating the mats 45, 46 is cured in a conventional way, and after a sufficient setting is reached, air is allowed to exhaust from the tube 40 through the pipe 42 and if necessary, the pressure within the tubes 31 is increased, whereby the upper section piece 21 is lifted from the lower section piece 20. Since however, the lifting stroke is limited, the tube 31 remains substantially surrounded by the section pieces, so that bursting of said tubes is prevented. But anyhow, air is now exhausted from the tube 31, and the bolts 38, which secure the intermediate piece 22 are now threaded off. Conventional means may now be threaded into the bushes 43, to lift the intermediate pieces 32 together with the finished article 45, 46 which may for instance form a frame for windows.

FIG. 7 shows an apparatus which is designed for the manufacture of large area articles, as for instance door panels. Such an apparatus may be made, similarly to the embodiment of FIG. 6, of separate pieces of metal, for instance a light metal such as aluminum, and/or of synthetic resin, of the type which is resistant to high temperatures. The parts of this apparatus corresponding to those shown in FIG. 6 will be referred to by the same reference numerals, accompanied by the letter "b." More particularly, such an apparatus comprises an upper intermediate piece 18 and a lower intermediate piece 19, both having a substantial area, but a rather simplified conformation, so as to be of ready manufacture, as is particularly understood with reference to the intermediate piece 18, which is in the form of a sheet.

According to an important feature of this embodiment, the whole apparatus is located within a closed autoclave 50, the walls of which are crossed by the pipe 32b connected to the tube 31b and by the pipe 29b connected to the tube 28b, whereas from a compressed air feeding pipe 51, a conduit 48b reaching the tube 47b and a conduit 52 opening in the autoclave are suitably branched.

Furthermore a pipe 53 connected to a vacuum source (not shown) has its branch 30b connected to the conduit 25b in communication with the channels 24b and its branch 54 opening in the autoclave 50.

When the channels 24b and consequently the cavity 23b are put under the action of the vacuum source through the conduit 25b, an equivalent decrease of the pressure in the autoclave 50 simultaneously occurs. If the pressure in the tube 47b is increased, an equivalent increase of the pressure in the autoclave 50 occurs. Since however, a pressure increase occurs in the tube 47 as a consequence of the polymerization heat, conventional adjustment means are provided which effect an adjustment of the air flows and thus an equalization of the pressure in the autoclave and in the expansible tube 47. For the rest, the operation is the same as described with reference to FIG. 6.

Figure 8:
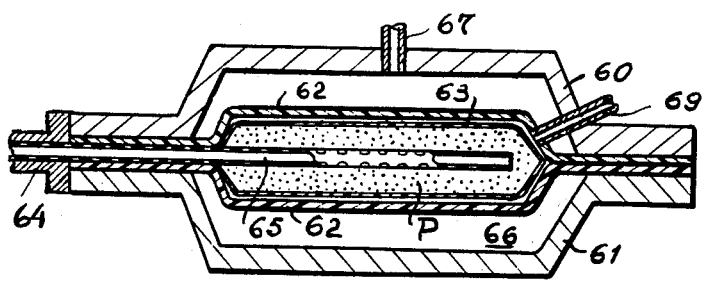
FIG. 8 is a diagrammatical sectional view of an apparatus for manufacturing hollow articles with inner foam fillers.

According to the invention, it is further possible to manufacture hollow articles, the cavity of which is filled with a foam filler, in a single molding step. Along the lines of the inventive process, in the cavity of such hollow articles to be manufactured, a certain quantity of a material is arranged, which is selected from the class consisting of such materials as are capable of foaming in hot condition or when adding certain conventional foaming agents. Heat is brought to act on these materials, for instance by a hot fluid or by heat transfer from outside. With reference to FIG. 8 an apparatus for carrying out such a process may consist of the mold parts 60, 61, wherein at least partly pre-formed sheets 62 of plastic material or of partly resin-impregnated fibrous material are arranged. These sheets are disposed so as to surround an inner tube 63, which may be omitted if it is supposed that at their ends the two sheets 62 are tightly in contact, for instance by clamping them, so that the inner cavity between themselves may be considered as being tightly sealed. Anyhow, this cavity may have exhaust conduits 69 which lead across the sheets or along their contact surfaces towards the exterior. The room defined by these two sheets is filled with particles P of a material suitable of being foamed or which is already partly foamed. A perforated tubular distributor member 65 made of heat-resisting rubber, synthetic resins or the like, is connected with a compressed-air and/or hot-fluid feeding supply 64, such tubular member having sufficiently thick or having rigid walls, to avoid any squeezing, when the pressure in the inner cavity between said sheets 62 is increasing. The cavity 66 in which a certain quantity of fluid synthetic resin has been added before closing the mold, and which is formed between said sheets 62 and the inner wall of the mold parts 60, 61 is suitably connected through pipes 67 to a vacuum source. Under these conditions, when air is sucked from the cavity 66, the behaviour of the two sheets 62, corresponds to that of a dilatable tube, even if the tube 63 is omitted, since the pressure between the marginal sealed sheets becomes higher than the pressure outside thereof. Admittance, if necessary, of compressed cold or hot air through the supply 64 may increase this inner pressure. Consequently, the sheets are compelled to assume the shape imposed by the inner walls of the mold parts. Simultaneously, previously or successively, hot fluid, for instance hot air or hot water, is further admitted from the supply 64 and through the tubular member 65 into the room between said two sheets, whereby a foaming occurs, with consequent increase in pressure, which further aids in the molding of the sheets.

The heat action contributes to a softening of the sheets, whereby their correct deformation under the inner and outer pressure action is suitably facilitated. If the sheets are made of reinforcing fibrous material, which has to be impregnated with synthetic resin, a suitable quantity thereof is added at least in the cavity 66, and after having connected said cavity to the vacuum source pipes 67, cold compressed air is fed through the tubular member 65 within the two sheets, whereby, as considered in a first instance in the previous example a finishing of the hollow article from synthetic resin and reinforcing fibrous material, occurs, whereafter the inner particles P are brought to foam, with the aid of the hot fluid. A reduction valve 68 provides for keeping the pressure of the hot fluid at the correct value. It is thus possible to obtain a hollow article with an inner filler, which may remarkably contribute to the stiffness of such article, even if having a remarkable size or area.

It is obvious that the tubular member 65 may be omitted if the foaming material is brought to foam under the action of a suitable conventional agent, a catalyst or the like. This tubular member may be also omitted if heat may be transferred to the inner particles P from the mold walls, which may be suitably heated. This tubular member may be left within the finished article in view of its low cost.

In order to improve the sticking of the inner foam filler to the outer synthetic resin sheets, the inner wall of these later or the outer wall of the tubular member may be provided with a layer of an adhesive material which becomes sticky under heat action.

Accordingly, it is possible to obtain shaped articles, which are completely closed or are provided with an opening on one side, such as receptacles, reservoirs, bottles and the like.

Figure 9:
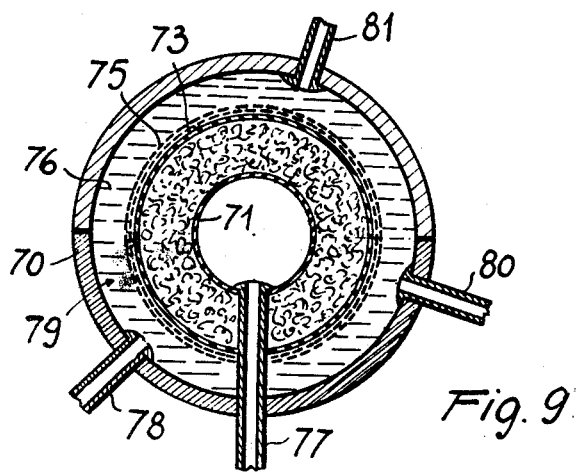
FIGS. 9 and 10 are cross-sectional and axial sectional views respectively of an apparatus for manufacturing a receptacle with foam-filled inner walls.
Figure 10:
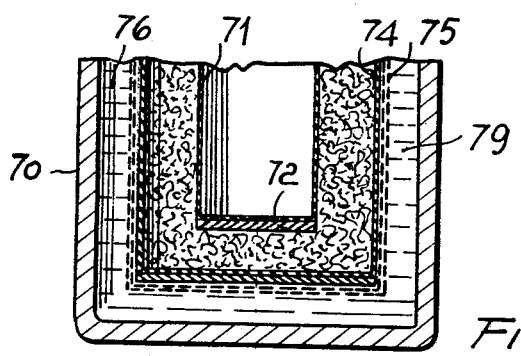

Referring to FIGS. 9 and 10, an apparatus for manufacturing such articles may be formed of an outer mold 70, wherein an inner tube 71, for instance of plastic material having connected thereto a bottom 72, is placed coaxially and concentrically with an outer tube 73, with a bottom 74, having a corresponding shape, but being of larger diameter. Suitable particles of a material capable of being foamed are introduced between the two tubes 71, 73 into the annular interstice, and thereafter, the upper ends of the tubes are welded to each other. Between the outer tube 73 and the mold 70, a reinforcing fibrous material mat 75 is placed, and a certain quantity of synthetic resin 76 is added. When admitting via pipe 77 compressed air to the room defined by the inner tube 71, this later assumes its final size. Subsequently, compressed air is admitted through a pipe 78 to the annular cavity between said inner and outer tubes 71, 73, after having put the cavity 79 between the outer tube 73 and the inner walls of the molds 70 under the action of a vacuum source through a pipe 80. Thereby, a molding of an outer rigid sheet is performed as occurs in the previously described embodiment, so that an article having an outer rigid wall is obtained from fiber reinforced synthetic material. Now, hot fluid, for instance hot air is admitted into the annular space between the outer tube 73 and the inner tube 71, whereby a foaming occurs, and thus this annular space becomes filled with a foam filler which may have heat-insulating properties. The hot air may be exhausted through an exhaust means 81. The heat action may perform a setting of the inner tube in its expanded condition. Thus, a receptacle is obtained having sandwich-type walls.

It is obviously possible to obtain in a similar manner, with the addition of top pieces, a receptacle which is closed on all sides, the inner cavity of which may be accessible by means of a valve, suitably embedded in one of the foam filled walls.

It is readily understood that any reference made hereinabove to tubes refers more specifically to any means suitable of being expanded, such as a tube system, a bag, or the like. Furthermore, any suitable synthetic resin may be conveniently used with the process according to the invention, provided it is sufficiently fluid for impregnating the fibrous reinforcing material, and is capable of ready polymerization in a simple or conventional way.

Although various embodiments have been described in detailed way, various modifications may be effected within the scope of the appended claims.

We claim:

1. A process for manufacturing hollow articles, comprising the steps of placing a dilatable hollow first insert within a mold provided with a cavity therefor, surrounding said first insert with at least one layer of fibrous reinforcing material, introducing a hardenable liquid into said cavity, disposing a dilatable hollow second insert within said first insert, filling said first insert with an expansible plastic adapted to surround said second insert, injecting a heated fluid into said second insert at a temperature sufficient to swell said plastic and under a pressure sufficient to expand said inserts for forcing said liquid into the interstices of said material and said material against the walls of said cavity, allowing said liquid to harden, and removing the hardened body thus formed from said mold.

2. A process for manufacturing hollow articles, comprising the steps of placing a dilatable hollow first insert within a mold provided with a cavity therefor, surrounding said first insert with at least one layer of fibrous reinforcing material, introducing a hardenable liquid into said cavity, evacuating said cavity to remove air trapped within the interstices of said reinforcing material, disposing a dilatable hollow second insert within said first insert, filling said first insert with an expansible plastic adapted to surround said second insert, injecting a heated fluid into said second insert at a temperature sufficient to swell said plastic and under a pressure sufficient to expand said inserts for forcing said liquid into the interstices of said material and said material against the walls of said cavity, allowing said liquid to harden, and removing the hardened body thus formed from said mold.

3. An apparatus for producing hollow articles from fibrous reinforcing material impregnated with a hardenable liquid, comprising mold means including a pair of complementary mold halves forming an enclosed chamber, a first dilatable hollow insert within said chamber, a second dilatable hollow insert within said first insert and defining therewith an annular compartment, first conduit means in one of said mold halves communicating with said chamber, second conduit means in one of said mold halves communicating with said second insert, evacuating means connected to said first conduit means for removing air trapped within the interstices of said first reinforcing material disposed about said insert, and pressure means connected to said second conduit means for injecting a heated fluid into said second insert to swell an expansible plastic disposed in said compartment, thereby forcing said liquid in said chamber into the interstices of said material and said material against the walls of said chamber, and locking means yieldably urging said mold halves against one another.

References Cited in the file of this patent

UNITED STATES PATENTS

| | | | |
|---|---|---|---|
| 2,382,958 | Burgoine et al. | Aug. 21, | 1945 |
| 2,414,125 | Rheinfrank | Jan. 14, | 1947 |
| 2,460,820 | Hogopian | Feb. 8, | 1949 |
| 2,536,182 | Humphrey | Jan. 2, | 1951 |
| 2,802,766 | Leverenz | Aug. 13, | 1957 |
| 2,803,043 | Stephens | Aug. 20, | 1957 |
| 2,832,995 | McCaw | May 6, | 1958 |
| 2,876,492 | Frieder et al. | Mar. 10, | 1959 |
| 2,977,268 | Randolph | Mar. 28, | 1961 |
| 2,977,269 | Nerwick | Mar. 28, | 1961 |
| 2,977,639 | Barkhuff et al. | Apr. 4, | 1961 |